US005089066A

United States Patent [19]

Hamada et al.

[11] Patent Number: 5,089,066

[45] Date of Patent: Feb. 18, 1992

[54] MAGNETS HAVING IMPROVED CORROSION RESISTANCE

[75] Inventors: Takaki Hamada; Tetsuji Hayakawa; Yutaka Matsuura, all of Osaka, Japan

[73] Assignee: Sumitomo Speical Metals Co., Ltd., Osaka, Japan

[21] Appl. No.: 360,101

[22] Filed: Jun. 1, 1989

Related U.S. Application Data

[60] Division of Ser. No. 818,238, Jan. 13, 1986, Pat. No. 4,837,114, which is a continuation-in-part of Ser. No. 812,992, Dec. 24, 1985, abandoned.

[30] Foreign Application Priority Data

| | | | |
|---|---|---|---|
| Dec. 24, 1984 | [JP] | Japan | 59-278489 |
| Jan. 18, 1985 | [JP] | Japan | 60-7949 |
| Jan. 18, 1985 | [JP] | Japan | 60-7950 |
| Jan. 18, 1985 | [JP] | Japan | 60-7951 |
| May 23, 1985 | [JP] | Japan | 60-110793 |
| May 23, 1985 | [JP] | Japan | 60-110794 |
| Sep. 10, 1985 | [JP] | Japan | 60-200890 |
| Nov. 20, 1985 | [JP] | Japan | 60-260769 |
| Nov. 20, 1985 | [JP] | Japan | 60-260770 |
| Nov. 20, 1985 | [JP] | Japan | 60-260771 |

[51] Int. Cl.[5] .......... G11B 5/70

[52] U.S. Cl. .......... 148/302

[58] Field of Search .......... 427/127; 148/302

[56] References Cited

U.S. PATENT DOCUMENTS

| | | | |
|---|---|---|---|
| 4,253,886 | 3/1981 | Aonuma | 427/127 |
| 4,865,915 | 9/1989 | Okonogi | 427/127 |

FOREIGN PATENT DOCUMENTS

| | | | |
|---|---|---|---|
| 2473209 | 7/1981 | France | 427/127 |
| 0049500 | 4/1977 | Japan | 427/127 |
| 0073840 | 6/1980 | Japan | 427/127 |
| 0146463 | 8/1984 | Japan | 427/127 |

*Primary Examiner*—Sam Silverberg

*Attorney, Agent, or Firm*—Fish & Richardson

[57] ABSTRACT

Fe-B-R type permanent magnet is produced by forming an anticorrosive coating film layer on a Fe-B-R base permanent magnet material body by means of vapor deposition to thereby improve the corrosion resistance thereof.

The anticorrosive thin film is formed of metal, oxides, nitrides, carbides, borides, silicides, composite compositions thereof, or a mixture thereof. Additionally blasting, shot peening, heat treatment for forming an interdiffusion layer, and/or resin impregnation may be applied.

12 Claims, No Drawings

MAGNETS HAVING IMPROVED CORROSION RESISTANCE

This application is a division of U.S. application Ser. No. 818,238, filed Jan. 13, 1986, now U.S. Pat. No. 4,837,114, which is a continuation-in-part of U.S. application Ser. No. 812,992, filed Dec. 24, 1985, now abandoned.

FIELD OF THE INVENTION

This invention relates to a rare earth-boron-iron base permanent magnet containing as the main components R (R standing for at least one of rare earth elements including Y), B and Fe and having improved corrosion resistance, particularly, a process for the production thereof.

BACKGROUND OF THE INVENTION

Currently typical permanent magnet materials are alnico, hard ferrite and rare earth-cobalt magnets. The rare earth-cobalt magnets have been used in various fields due to their much excellent magnetic properties. However, it is now expected to encounter difficulty in stable supply of them in greater amounts and over an extended period of time, since the key components Sm and Co are both scarce and expensive.

For that reason, there has been an keen desire for permanent magnet materials excelling in magnetic properties and comprising compositional elements that are abundant and inexpensive, and will stably be supplied.

The present applicant (or company) has already proposed Fe-B-R base (wherein R is at least one of rare earth elements including Y) permanent magnets as the novel high-performance permanent magnets (Japanese Patent Kokai-Publication Nos. 59-46008, 59-64733, 59-89401 and 59-132104; EP publication of application Nos. 0101552, 0106948, 0126179, 0126802, 0124655 and 0125347). The permanent magnets disclosed therein are an excellent permanent magnet in which abundant rare earth elements, mainly Nd and/or Pr, are used as R, and R, B and Fe constitutes the main components, and which shows a practical energy product of at least 4 MGOe or 10 MGOe, as well as an extremely high energy product of 20, 25, 30, 35 MGOe or higher.

With the recent trend to high performance and diminishing sizes of magnetic circuits, increasing attention has been paid to Fe-B-R base permanent magnet materials. In the production of permanent magnet materials for that purpose, formed (compacted) and sintered magnet bodies have to be cut on the entire surface or the required surface portion for removing surface irregularities or strains or surface oxide layers, in order to incorporate them in magnetic circuits in later steps. For cutting, use is made of outer blade cutters, inner blade cutters, surface grinders, centerless grinders, lapping machines, etc.

SUMMARY OF THE DISCLOSURE

However, since the Fe-B-R base permanent magnet materials contain as the primary components rare earth elements and iron which undergo oxidation in the air so easily that stable oxides are immediately formed, they generate heat or form oxides due to the contact thereof with the cutting surface upon being processed by the aforesaid machines, thus offering a problem of deterioration of the magnetic properties.

Furthermore, when permanent magnets comprising Fe-B-R based, magnetically isotropic sintered bodies are incorporated into magnetic circuits, reductions and variations in the outputs of the magnetic circuits will occur. A problem also arises that surrounding devices may be contaminated by the separation of surface oxides.

To solve the aforesaid problems, the present applicant has already proposed permanent magnets in which anticorrosive metal layers are coated on the surface of magnet bodies by the electroless plating or electroplating technique (Japanese Patent Application No. 58-162350), or anticorrosive resin layers are coated on the surface of magnet bodies by the spray or immersion technique (Japanese Patent Application No. 58-171907) with a view to improving the corrosion resistance of the aforesaid Fe-B-R base permanent magnets.

In the former plating technique, however, there is a fear that the resulting magnets may be rusted with changes with age, since the base bodies are sintered, porous masses, in the pores of which an acidic or alkaline solution remains in the pre-plating treatment. Also, there is a problem that the magnets may be corroded on the surface during plating with the resulting drops of adhesiveness and corrosion resistance.

In the latter spray technique, on the other hand, a number of steps and much labor are needed to apply a uniform resin coating on the entire surface of the bodies to be treated, since the resin is sprayed in a certain direction. In particular, difficulty is involved in the application of a uniform coating on complicatedly and irregularly shaped magnets. In the immersion technique, there is also a problem that the resin coating becomes irregular in thickness, thus resulting in a drop of the dimensional accuracy of the products.

Generally, it is a primary object of the present invention to overcome the drawbacks in the art of the Fe-B-R base permanent magnet materials hereinabove mentioned.

This invention therefore has for its object to obtain a novel permanent magnets composed mainly of rare earth elements, boron and iron, which introduce improvements into the corrosion resistance of the Fe-B-R base permanent magnet materials as proposed already, and more particularly, aims at providing a novel process for producing the Fe-B-R base permanent magnets in which an anticorrosive thin film showing excellent adhesiveness and corrosion proofness can be applied in a uniform thickness on the surface of a magnet material without using any corrosive chemicals and hence with no possibility that they may remain.

Further, this invention has for its object to provide a method for processing the Fe-B-R permanent magnets which eliminates deteriorations of the magnetic properties thereof taking place in association with the oxidation and cutting processing of the magnet material bodies (particularly, sintered bodies).

Stillmore, this invention has for its object to provide a process for the production of the Fe-B-R base permanent magnet materials containing as the main components rare earth, boron and iron, which can eliminate deteriorations of magnetic properties taking place in association with the cutting processing of magnet material bodies (particularly sintered bodies).

Generally, according to the present invention, there is provided a process for producing a permanent magnet material characterized by:

providing an Fe-B-R base permanent magnet material wherein at least 50 vol % of the entire material (i.e., major phase) consists of an Fe-B-R type tetragonal crystal structure, and forming an anticorrosive coating film layer on said material body by means of vapor deposition, to thereby improve the corrosion resistance thereof.

According to the first aspect of the present invention there is provided a process for producing a permanent magnet characterized by:

providing a permanent magnet material body consisting essentially of 10-30 at % R wherein R is at least one element selected from the group consisting of Nd, Pr, Dy, Ho and Tb, or a mixture of said at least one element and at least one selected from the group consisting of La, Ce, Sm, Gd, Er, Eu, Tm, Tb, Lu, Pm and Y, 2-28 at % B and at least 42 at % Fe and wherein at least 50 vol % of the entire magnet material body consists of an Fe-B-R type tetragonal crystal structure; and forming an anticorrosive coating film layer on the permanent magnet material body by means of vapor deposition to thereby improve the corrosion resistance thereof.

Typically, the permanent magnet material body is a sintered body, however, it may be a hot pressed body.

Preferably, 50 at % or more of R is Nd and/or Pr.

In the first aspect, Fe is preferably at least 52 at % (more preferably 65 at %) and more preferably no more than 80 at %. A permanent magnet material body which comprises 12-24 at % R wherein at least 50 at % of R is Nd and/or Pr, 4-24 at B and at least 52 at % Fe, is preferred for providing magnetic energy product of at least 10 MGOe, wherein Fe of up to 82 at % is preferred.

In the present disclosure, the symbol "R" generally represent rare earth elements in the broad sense i.e., lanthanide and yttrium. However, in the following "R" specifically represents the selected elements hereinabove defined in the first aspect, if not otherwise specified.

The anticorrosive thin film is formed by the vapor deposition technique which embraces vacuum deposition, physical vapor deposition and chemical vapor deposition. The physical vapor deposition further embraces ion sputtering, ion plating and ion-vacuum deposition (IVD).

Plasma vacuum deposition may be classified as the chemical vapor deposition (CVD). Note, however, that the CVD such that employs halogen compound gas is not preferred.

The anticorrosive thin film is formed of at least one selected from the group consisting of metal, oxides, nitrides, carbides, borides, silicides, composite compositions (or compounds) thereof, and a mixture thereof. Thus the anticorrosive thin film may be a metal film or ceramic film. Preferably, the anticorrosive thin film is formed of at least one selected from the group consisting of Al, Zn, Ni, Cr, Cu, Co, Ti, Ta, Si, Ag, Au, Pt, Rh and alloys thereof: oxides of Si, Al, Cr, Ti and Ta, nitrides of Si, Ti, Ta and Al, carbides of Si, Ti and W, boron nitride, composite compounds thereof and a mixture thereof.

According to the second aspect of the present invention, blasting is applied to the surface of the permanent magnet material body prior to the application of said vapor deposition, thereby removing oxide layer and/or machining strain layer (or Bailby layer).

In the preferred embodiment, the blasting involves jetting hard particles having a mean particle size of 20-350 micrometers and a Mohs hardness of at least 5, end more preferably, the blasting is effected by blasting said particles together with a pressurized gas of 1.0-6.0 kgf/cm$^2$. Grit may be used as the suitable hard particles.

According to the third aspect of the present invention, shot peening is applied after the anticorrosive thin film has been formed on the surface of said permanent magnet material body. The shot peening may be applied with or without the blasting to be applied prior to the vapor deposition. The shot peening involves jetting spherical particles having a mean particle size of 30-3000 micrometers and a Mohs hardness of at least 3. Preferably shot peening is effected by jetting said particles together with a pressurized gas of 1.0-5.0 kgf/cm$^2$.

According to the fourth aspect of the present invention, the shot-peened surface of said permanent magnet material body is further treated with chromating, thereby providing an improved anticorrosion resistance.

According to the fifth aspect of the present invention, an interdiffusion layer is provided between the magnet material body and the anticorrosive coating film layer by heat treating the resultant mass of the step concerned. This heat treating is effected after the formation of the anticorrosive coating film layer.

According to the sixth aspect of the present invention, anticorrosive coating film layer is impregnated with a resin in order to further improve the anticorrosion resistance.

The impregnated resin serves to fill the micropores in the deposited layer. The resin is preferably a heat resistant resin.

It is most preferred to apply all the aspects of the present invention, however, any of the second or subsequent aspects may be eliminated depending upon the ultimate purpose in use.

According to the first embodiment of the first aspect, the vapor deposition is effected by the vacuum deposition. A permanent magnet body containing as the main components 10-30 at % R (where R is at least one element selected from the group consisting of Nd, Pr, Dy, Ho and Tb, or a mixture of said at least one element and at least one selected from the group consisting of La, Ce, Sm, Gd, Er, Eu, Tm, Yb, Lu, Pm and Y), 2-28 at % B and the balance (preferably 65-80 at %) Fe and having its major phase consisting of an Fe-B-R type tetragonal crystal structure is disposed together with a coating material in a reduced pressure or vacuum vessel, and evaporating said coating material by heating, whereby an anticorrosive thin film comprising said coating material is formed and coated on the surface of said permanent magnet body.

According to the second embodiment of the first aspect, the ion plating is applied as the vapor deposition. The ion plating is characterized by heating a coating material forming an anode in a vacuum vessel in the presence or absence of a reactive gas to bring it into an atomic, molecular or particulate state (vapor), followed by colliding thermoelectron with the resulting vapor for ionization, accelerating by an electrical field and further colliding the thus ionized particles of said coating material with other evaporated particles to increase the number thereof, and depositing the resulting ionized particles onto the surface of a permanent magnet material body forming a cathode, whereby an anticorrosive thin film comprising said coating material is formed and coated on said body.

According to the third embodiment of the first aspect, the sputtering is applied as the vapor deposition. This embodiment is characterized by discharging an argon gas and/or a reactive gas introduced in a vacuum vessel by means of a sputter power source, and accelerating the ionized gas by an electrical field into collision with a target plate comprising a coating material to release coating atoms therefrom, whereby an anticorrosive thin film is formed and coated on the surface of a permanent magnet material body disposed in said vessel.

According to the second aspect of the present invention, there is provided a method for processing permanent magnet material body by blasting to remove the oxide layer or machining strain layer. This blasting is effected typically as follows:

A hard powder comprising at least one of powders having a mean particle size of 20 to 350 microns and a Mohs hardness of no lower than 5, together with a gas pressurized to 1.0 to 6.0 kgf/cm$^2$, is blasted onto the surface of a sintered permanent magnet body for 0.5 to 60 minutes for the removal of an oxide or distortion layer thereon.

According to this aspect of the present invention, a vapor deposition thin film layer is thereafter deposited onto the surface of said magnet body. The sand or grit blasting using sand or grit of the random shape is preferred as the blasting.

According to the third aspect of the present invention, the deposited thin film is treated by shot peening to improve the anticorrosion resistance. It is preferred to apply blasting, vapor deposition and thereafter shot peening treatment. Typically, after grit blasting a vapor deposition thin film layer is deposited onto the surface of said magnet body, and a spherical powder comprising at least one of powders having a mean particle size of 30–3000 microns and a Mohs hardness of no lower than 3, together with a gas pressurized to 1.0 to 5.0 kg/cm$^2$, is blasted for shot peening onto the surface of said magnet body for 1 to 60 minutes.

According to the fourth aspect of the present invention, if required, the surface of vapor deposition thin film layer is treated with chromating, whereby the corrosion resistance of said magnet body is improved. The chromating treatment is preferably made after the shot peening.

According to the fifth aspect, an interdiffusion layer may be formed after the vapor deposition procedure, with or without subsequent steps hereinabove described as the second through fourth aspects. The interdiffusion layer is formed between the permanent magnet material and the vapor-deposited thin film layer by means of heat treatment, to thereby improve the magnetic properties and anticorrosion resistance.

According to the sixth aspect, the vapor-deposited thin film layer may be impregnated with a resin (preferably heat resistant resin) to fill micropores which may remain in the thin layer to thereby further improve anticorrosion resistance, particularly gas permeability of the thin film layer. The resin impregnation can be applied directly after the vapor deposition or after the additional steps.

The present invention provides also an improved permanent magnet material (or magnet) produced according to the any of the preceding aspects of the present invention.

DETAILED DESCRIPTION OF THE PREFERRED EMBODIMENTS

First Aspect

One embodiment of this invention provides a permanent magnet having improved corrosion resistance, wherein an anti-corrosive thin film layer formed of metals (such as Al, Ni, Cr, Cu, Co, etc. or their alloys), or ceramic material such as oxide (such as $SiO_2$, $Al_2O_3$, $Cr_2O_3$), nitride (such as TiN, AlN, BN), carbide (such as TiC, SiC), silicide, boride or composite composition (or compound) thereof, etc. is formed and coated on the surface of a permanent magnet body by the vapor deposition technique, said magnet body containing the main components 10–30 at % R (R representing the selected, specific rare earth elements), 2–28 at % B and at least 42 at (preferably 65–80 at %) Fe and having its major phase comprised of an Fe-B-R type tetragonal crystal structure, and a process for the production of the same. The metal includes Al, Zn, Ni, Cr, Cu, Co, Ti, Ta, Si, Ag, Au, Pt, Rh or alloys thereof. The oxide, nitride or the like compounds may be those of any of said metals. The thin film layer may be crystalline, however, a glassy or amorphous layer may be deposited, if desired. Generally, the anticorrosive thin film layer may be a stable layer such that can be deposited through the vapor deposition technique, has a resistance to oxidation or other harmful gas and has a low gas permeability.

This invention provides a production process for forming a uniform, firm and stable anticorrosive thin film layer on the surfaces of the Fe-B-R base permanent magnets to inhibit the oxidation of the magnet material. By the anticorrosive thin film formed according to the present invention, the surface oxidation of magnet bodies is inhibited. Further, since any corrosive chemicals, etc. are not used and, hence, there is no possibility that they may remain, the magnetic properties are stably maintained over an extended period of time without deterioration.

In this invention, the formation of the anticorrosive vapor deposition layer on the surfaces of magnet materials relies upon the vacuum deposition, physical vapor deposition (ion sputtering, ion plating, ion-deposition thin-film formation (IVD)), chemical vapor deposition (plasma-deposition thin-film formation) and like vapor deposition techniques.

According to the vacuum deposition technique, a coating substance is heated in vacuum by means of resistance heating, ion beam heating, induction heating, etc. to put it into an atomic, molecular or finely particulate state, whereby the permanent magnet body to be coated is formed on the surface with the anticorrosive thin film comprising the metals, alloys or compositions (or compounds) as mentioned in the foregoing.

According to the ion sputtering technique, an argon gas is admitted into a vacuum vessel, and electrical discharge is produced therein by means of a sputter power source. The ionized argon gas is accelerated by an electrical field into collision with a target material that constitutes a cathode comprising a coating substance, thereby emitting atoms out of the target material, thereby the emitted atoms are deposited on the surface of the permanent magnetic material body. In this manner, the aforesaid anticorrosive thin film is formed on the surface of a permanent magnet material body forming an anode.

According to the ion plating technique, a coating material is heated by means of resistance heating, electron beam heating, induction heating, etc. to bring it into an atomic, molecular or finely particulate state. Thermoelectrons are then collided with the thus obtained particulated coating material for ionization. The ionized particles, traveling along an electrical field, are collided with other evaporated particles to increase the number thereof. These ionized particles are attracted by an electrical field, and are deposited onto the surface of a permanent magnet body forming a cathode, thereby forming the aforesaid anticorrosion thin film layer.

According to the ion vapor deposition thin-film formation technique, evaporated substances by means of an electron gun, arc discharge, etc. and ions supplied from an ion source and accelerated by a high-accelerating voltage are simultaneously deposited and ion-radiated in a certain proportion, whereby the aforesaid anticorrosive thin film is formed on the surface of a permanent magnet material body.

According to the plasma vapor deposition thin-film formation technique (a sort of CVD), the starting gas for the formation of thin films is introduced into a vacuum vessel, and is maintained at a constant pressure with the use of a vacuum pump. Discharge is then effected by the application of high-frequency power on the electrodes, whereby the aforesaid anticorrosive thin film is formed on the surface of a permanent magnet material body through a plasma chemical reaction.

In accordance with this invention, the anticorrosive thin film formed on the surface of a permanent magnet material body by any one of the aforesaid vapor deposition techniques can provide a thickness suitable for anticorrosion resistance.

The alloys for permanent magnets according to this invention are also characterized by containing at least 50 vol % of a compound of an Fe-B-R type tetragonal crystal structure having a crystal grain size of 1-100 micrometers (preferably 1-80 micrometers) and 1-50 % (in volume ratio) of nonmagnetic phases (except for oxide phases).

Based on this invention, therefore, it is possible to obtain at low costs improved permanent magnets having an extremely high energy product of no lower than 25 MGOe and excelling in residual magnetic flux density, coercive force and corrosion resistance by using as R resourceful light rare earth, primarily Nd and/or Pr, and as the main components Fe, B and R.

According to the vacuum deposition used in this invention, the substance required to form a thin film is charged in a reduced-pressure vessel having a degree of vacuum of about $10^{-4}$-$10^{-7}$ Torr, and is heated for evaporation or sublimation. The resulting vapor is then condensed on the surface of a magnet material body placed in the same vessel to form and coat the thin film.

The substance to be evaporated in accordance with the vacuum deposition technique may be heated in the crucible heating system or the direct heating system such as, e.g., resistance heating, high-frequency induction heating, electron beam heating, which may suitably be selected depending upon the composition and thickness of the coating substance to be deposited, the shape of the permanent magnet on which it is to be deposited, workability, etc.

Preferably, the coating substances to be evaporated include metals, alloys, ceramics and compositions (or compounds), e.g., nitrides, oxides, carbides, borides, silicides of metals (or composite composition), which can improve the corrosion resistance of the present permanent magnets. The substances include metals, for instance, Al, Zn, Ni, Cr, Cu, Co, Ti, Ta, Si, Au, Ag, Pt, Rh, etc., or their alloys, or $SiO_2$, $Al_2O_3$, $Cr_2O_3$, TiN, AlN, TiC, etc. As the metal noble metals may be used, however, will entail disadvantage in cost. Not only a single layer but also a superposed layer may be deposited. For instance, a metal layer (e.g., Al or Si) may be first deposited, then oxide layer (e.g., $Al_2O_3$ or $SiO_2$) may be deposited thereon. The oxide layer may be formed by oxidation of the deposited metal layer. The deposited film is preferably 30 micrometer or less thick.

According to the ion plating technique used in this invention, vapor deposition is carried out in a vacuum vessel having a degree of vacuum of, e.g., $10^{-4}$-$10^{-7}$ Torr, as mentioned previously.

The substance to be ionized may be heated in the crucible heating system or the direct heating system such as resistance heating, high-frequency induction heating, electron beam heating, etc., which may suitably be selected depending upon the composition and thickness of the coating substance to be deposited, the shape of the permanent magnet on which it is to be deposited, workability, etc.

The coating substances to be evaporated include metals, alloys, ceramics and compounds which are mentioned previously. The ion plating is suitable for depositing a plurality of elements simultaneously.

Where nitride, oxide or carbide films are formed on the surfaces of permanent magnet bodies by the ion plating technique, it is preferred that a reactive gas such as $O_2$, $N_2$, $CO_2$, acetylene or the like is introduced into a vacuum vessel. In the case of forming alloy coating films, a plurality of evaporation sources are provided for the respective alloy components, which are evaporated in a certain proportion for the formation of alloy coating films having a certain composition.

According to the sputtering technique used in this invention, the coating material to be formed and coated and the permanent magnet body on which it is to be deposited are used as a cathode target material and an anode, respectively, in an inert (e.g., argon) atmosphere of a reduced pressure. A voltage is then applied between at least two electrodes for the ionization of the atmosphere gas. The resulting cations are accelerated by an electrical field to collide with the surface of the cathode with a large kinetic energy for the cathode sputtering of atoms present thereon, whereby the thus emitted atoms are condensed on the surface of the magnet material body forming the anode to form and coat a thin film.

The sputtering techniques used include D.C. sputtering such as bipolar sputtering, bias sputtering and the like, A.C. sputtering such as asymmetrical A.C. sputtering, high-frequency sputtering or the like, and other sputtering such as getter sputtering, plasma sputtering or the like. Referring particularly to D.C. bipolar sputtering, high frequency sputtering and plasma sputtering, there is the so-called reactive sputtering, according to which at least one of reactive gases such as $N_2$, $O_2$, $C_2H_2$, $CO_2$ and the like is introduced in a high-vacuum inert (argon) atmosphere for reaction with the released atoms, thereby forming a thin film of a composition (or compound) such as a nitride, oxide or carbide of the target metal. These techniques may suitably be selected depending upon the composition and thickness of the coating substance to be deposited, the shape of the permanent magnet on which it is to be deposited, workability, etc.

The target materials, viz., the coating materials preferably include metals, alloys, ceramics and compounds which have been mentioned previously.

It is desired in the sputtering techniques that a single target be used in the case where the anticorrosive thin films to be formed on permanent magnet bodies are formed of single metal, and a plurality of targets be applied in the case where they are formed of alloys.

Second Aspect

Usually, cutting is required for manufacturing the end products of the Fe-B-R base magnets. However, the usual cutting processing offers a problem that the magnetic properties of the magnet products deteriorate, partly because of the occurrence of cutting strains, and partly because of the formation of oxides due to the generation of heat during machining and the contact of surface to be machined with the atmosphere. Therefore, if such unpreferred surface layers are removed from the surfaces of the magnets in a proper manner, followed by the provision of protective coating layers, the magnets are then expected to be further improved in terms of magnetic properties and durability.

The foregoing object is achieved by blasting a hard powder comprising at least one of powders having a mean paricle size of 20–350 microns and a Mohs hardness of no lower than 5, together with a gas pressurized to 1.0–6.0 $kgf/cm^2$, onto the surface of a sintered permanent magnet body for 0.5–60 minutes for the removal of surface layers from said magnet material body. The blasting may be sand or grit blasting.

More specifically, this aspect contemplates eliminating or preventing deteriorations of the magnet properties of sintered magnet bodies due to oxidation and machining strain (deterioration due to machining) by blasting a hard powder having the required properties, together with a pressurized gas, onto the surfaces thereof for the removal of surface layers such as black skin, oxide and machining strain layers.

By the application of the processinq method according to this aspect, it is possible to obtain at low costs Fe-B-R base permanent magnet materials which are free from any deterioration of the magnet properties due to cutting and oxidized layers.

The hard powders having a Mohs hardness of no lower than 5, which are used in this invention, may be based on $Al_2O_3$, silicon carbide, $ZrO_2$, boron carbide, garnet and the like. Preference is given to $Al_2O_3$ base powders having a high hardness. The powders used are preferably of the random shape.

Powders having a Mohs hardness below 5 are unpreferred, since so small is then a blast-grinding force that an extended period of time is required for blast-grinding.

The reason why the mean particle size of the hard powders is limited to 20–350 micrometers is that, at below 20 micrometers, so small is a blast-grinding force that an extended period of time is needed for cutting, while, at higher than 350 microns, so large is the surface roughness of sintered magnet bodies that the amount of blast-grinding becomes uneven.

Referring to the blasting conditions of the hard powders, a prolonged period of time is needed for grinding at a pressure of below 1.0 $kgf/cm^2$, while, at a pressure exceeding 6.0 $kgf/cm^2$, there is a fear that the surface roughness of magnet bodies may drop due to the fact that the amount of blast-grinding of the surfaces thereof becomes uneven.

When the blasting time is below 0.5 minutes, the amount of blast-grinding becomes limited and uneven, and when it exceeds 60 minutes, the amount of blast-grinding of the surfaces of magnet bodies increases with the resulting drop of surface roughness.

Air or inert gases such as Ar, $N_2$ and like gases may be used as the pressurized fluids for blasting the hard powders. However, preference is given to the use of inert gases for the purpose of preventing oxidation of magnet bodies. It is also preferred that air is dehumidified for use.

Suitably, the deposition of vapor deposition layers on the surfaces of sintered magnet bodies, which have been cleaned of surface oxide layers, may be effected relying upon the thin-film formation techniques such as vacuum deposition, sputtering, ion plating, etc. The thin film layers should have a thickness of, preferably no higher than 30 microns, most preferably 5–25 microns in view of their peeling, a drop of their mechanical strength and the assurance of their corrosionproofness.

Third Aspect

The Fe-B-R base permanent magnets are considerably improved in terms of corrosion resistance by the deposition of vapor deposition layers after the blasting. Since the evaporated metal particles deposited on the surfaces of magnet bodies in the case of the deposition techniques, however, the aforesaid vapor deposition layers may be sometimes deficient in density. This may further lead to a problem that local separation or cracking of the coated thin films occurs, resulting in local rusting.

Such a problem is solved by depositing a vapor deposition thin film layer on the surface of a magnet material body which has been cleaned in the foregoing manner, and, thereafter, blasting a spherical powder comprising at least one of powders having a mean particle size of 30–3000 micrometers and a Mohs hardness of no lower than 3, together with a gas pressurized to 1.0–5.0 $kgf/cm^2$, onto that surface for, e.g., 1–60 minutes for shot peening.

More specifically, a certain powder having the required properties, together with a pressurized gas, is blasted (shot-peened) onto the surface of a vapor deposition thin film layer to densify said thin film layer and enhance the adherence between the magnet body and said film layer.

Like in the foregoing, the coating materials used in this treatment preferably include metals, alloys, ceramics and compounds, e.g., nitrides, oxides or carbides of metals, which can improve the corrosion resistance of the present permanent magnets, such as metals, for instance, Al, Ni, Cr, Cu, Co, etc., or their alloys, or $SiO_2$, $Al_2O_3$, $Cr_2O_3$, TiN, AlN, TiC, etc. However, particular preference is given to Al (aluminum).

The shot peening powders used include spherical hard powders having a Mohs hardness of no lower than 3, such as steel balls, glass beads, etc., and may have a hardness equal to or higher than that of the thin film layer on which they are to be deposited. Preference is given to glass beads.

Spherical peening powders having a Mohs hardness of below 3 are unpreferred, since they produce no sufficient peening effect due to the fact that their hardness is lower than that of the vapor deposition thin film layer.

The reason why the mean particle size of the spherical peening powders is limited to 30–3000 micrometers is that, at below 30 micrometers, so small is a force to be applied on the thin film layer that a prolonged period of time is needed for peening, while, a larger size than 3000 micrometers, so large is the surface roughness of sintered permanent magnet bodies that the finished surfaces becomes uneven. A more preferable mean particle size ranges from 40 to 2000 micrometers.

Referring to the jetting conditions for spherical powders, a force to be applied on the thin film layer is so small at a pressure of below 1.0 kgf/cm$^2$ that a prolonged period of time is needed for peening. At a pressure exceeding 5.0 kgf/cm$^2$, on the other hand, a force to be applied on the thin film layer becomes uneven, resulting in a deterioration surface roughness.

Further, when the blasting time is below 1 minute, it is impossible to treat uniformly the entire surface of the thin film layer. Although the upper limit of the blasting time is determined depending upon the peening amount and conditions, a time exceeding 60 minutes is unpreferred, since there is then a drop of surface roughness.

For the same reason as mentioned in the foregoing, the thin film layer should have a thickness of, preferably no higher than 30 micrometers, most preferably 2 to 25 micrometers.

Fourth Aspect

If required, the magnet body having said thin film layer deposited thereon may further be treated by chromating to form a chromate coating film on the surface of said thin film layer, thereby further improving the corrosion resistance of the magnet body. In this manner, it is possible to further improve durability of the Fe-B-R base permanent magnets.

The chromate coating film deposited on the thin film layer should preferably have a thickness from a few angstrom to one micrometers, and have preferably its appearance finished to a color of light iridescence to yellowish brown assuming golden color.

Fifth Aspect

According to the fifth aspect of the present invention, it is possible to further improve or enhance the magnetic properties and corrosion resistance of each of the coated permanent magnets prepared according to the 1st to 4th aspects of the present invention by heat-treating said magnet to form an interdiffusion layer on the interface of the deposited coating and the magnet material body.

In each of the 1st to 4th aspects of the present invention, the vapor deposition coating is physically deposited onto the surface of the present permanent magnet material into a firm film having a uniform thickness. Under the general conditions, however, the deposited coating film grows in the columnar form during deposition, so that there occur gaps between the growing particles. In some cases, water may enter those gaps, resulting in rusting. This gives rise to a drop of mechanical and thermal strength stability over an extended period.

Such a problem can be eliminated by the heat treatment to be described below.

More specifically, the vapor deposited permanent magnet material of the present invention is subjected to the predetermined heat treatment to fill up the aforesaid gaps through the melting effects and form a diffusion layer on the interface of the deposited phase and the permanent magnet material body, thereby promoting diffusion, into the crystal grain boundaries, of the deposited coating layer-forming elements, not to speak of the crystal grains of the magnet layer. This results in great improvements in the corrosion resistance of the grain boundaries as well as the mechanical and thermal strength of the vapor-deposited coating, whereby peeling-off of the thin film and rusting can be avoided. According to that heat treatment, a stable passivated oxide is formed on the surface of the vapor-deposited coating. Thus, the permanent magnet of the present invention can be used under extremely severe environmental conditions for an extended period.

There is also an advantage that the present permanent magnet including on the surface the vapor-deposited coating and the interdiffusion layer is improved in terms of coercive force for the following reasons.

Namely, the Fe-B-R base sintered permanent magnet has its major phase (at least 50 vol %) consisting of $Nd_2Fe_{14}B$ crystal grains of ca. 10 micrometers (e.g., if Nd is used as R), surrounding bcc phase and Nd-rich phase and a small amount of a B-rich phase. Among others, the presence of the $Nd_2Fe_{14}B$ and bcc phases takes a great part in the generation of coercive force. However, in the Fe-B-R base permanent magnet, the bcc phase is formed, only when the Nd-rich phase and the tetragonal $Nd_2Fe_{14}B$ phase exist. However, on the surface of the permanent magnet there is present only the tetragonal $Nd_2Fe_{14}B$ crystal phase without the surrounding bcc phase. This results in a lowering of the coercive force of the magnet surface layer, and is responsible for the degradation of the magnetic properties of the permanent magnet, when it is machined into a small or thin product or article.

According to the 5th aspect of the present invention, however, the interdiffusion layer formed on the interface of the vapor-deposited coating layer and the permanent magnet material body serves to enhance the crystal magnetic anisotropy appearing at the abovementioned portion, so that any drop of the coercive force appearing on the magnet surface is avoided with improvements in the magnetic properties.

Another factor of rusting is that the formation of thin films (vapor-deposited coating films) does not well proceed at the crystal boundary due to the presence of the R-rich phase at the crystal grain boundaries of the permanent magnet. However this problem is eliminated by the formation of the aforesaid interdiffusion layer.

In this aspect of the present invention, the formation of the interdiffusion layer on the interface of the vapor-deposited coating and the permanent magnet material is achieved by heat treatment in the atmosphere or in vacuum. It is preferred, however, that, when the heat treatment is carried out after vapor deposition has been applied to the aged permanent magnet, its treatment temperature ranges from 250° C. to the aging temperature. This is because only insufficient diffusion takes place between the vapor deposited coating and the permanent magnet at a temperature of lower than 250° C., while the effect of the aging treatment previously applied disappears at a temperature higher than the aging temperature.

Where the heat treatment is carried out after vapor-deposited layer has been applied to the permanent magnet which has not been aged, it is preferred that the heat treatment temperature ranges from 250° C. to the melting point of the vapor-deposited metal used while the melting point should not exceed the sintering temperature. It should be noted that, depending upon the temperature conditions for heat treatment, aging may be carried out simultaneously with heat treatment, and so the subsequent aging can be omitted.

Turning to the aging temperature for the permanent magnet body of the present invention, a temperature of 350° C. to the sintering temperature (900°-1200° C.) of that magnet body is preferably applied when one-stage aging is applied. For two-stage aging, it is preferred that a temperature of 750°-1000° C. is applied at the first stage, and a temperature of 480°-700° C. is applied at the second stage.

For the one-stage aging, it is preferred that the heat treatment is carried out at a temperature of 250° C. to the aging temperature, and for two-stage aging, it is preferred that the heat treatment is effected at a temperature of 250° C. to the first-stage aging temperature.

Where the heat treatment is carried out without application of aging at a temperature of 250° C. to the melting point of the vapor-deposited metal, it is desired in view of the resulting magnetic properties that aging be conducted after that heat treatment.

Furthermore, where the heat treatment temperature to be applied after aging is higher than the temperature for that aging, it is required that the aging be again conducted.

To obtain the required interdiffusion layer, the heat treatment is preferably carried out for 5 minutes to 5 hours, although it may be effected for a suitable period of time, depending upon the type of vapor deposited metals, the amount to be treated and the temperature condition.

In this aspect of the present invention, it is preferred that the diffusion layer formed on the interface of the vapor-deposited coating layer and the permanent magnet body by heat treatment has a thickness of 0.01 to 10 micrometers in view of the corrosion resistance and adhesion strength with respect to the underlying magnet body.

In the case that the vapor-deposited metals are aluminium, chromium, titanium, etc., a layer of the oxide thereof is formed on the surface of the vapor deposited coating layer during heat treatment, and is then passivated (e.g., oxidized) to introduce further improvements in corrosion resistance. The resulting magnet can be used for a prolonged period under the conditions that are more severe than applied in the prior art.

Where both the heat treatment and the shot peening treatment are carried out, it is preferred that, after the peening treatment, the diffusion layer is formed by the heat treatment. As will be discussed later, further improvements are introduced into corrosion resistance by the application of resin impregnation following the heat treatment.

Sixth Aspect

Reference will now be made to the sixth aspect of the present invention.

The coated permanent magnet prepared according to each of the 1st to 5th aspects of the present invention excels in corrosion resistance. However, it would be unavoidable that extremely fine micropores are present in the coating film. Thus, there is still a fear that local peeling-off or cracking of the coating film (layer) may take place, while the magnet is used over an extended period and/or under severe conditions, leading to local rusting.

The possibility of the aforesaid magnet being rusted under such severe conditions is reduced or limited to a considerably little degree by impregnating the coating film layer of the magnet which has been subjected to vapor deposition (or further shot peening or further chromate treatment) with a resin (preferably heat-resistant resin).

For instance, a thermosetting resin is impregnated in the surface of the magnet, which has been washed with a solvent (or water). After the solvent (or water) is dried off, the resin remaining in the pores of the coating film is thermally set.

As the resins to be impregnated into the micropores of the vapor-deposited thin coating film, use may be made of (general thermosetting resins such as), e.g., urea resin, melamine resin, phenol resin, epoxy resin, unsaturated polyester, alkyd resin, urethane resin, ebonite, etc. Particular preference is given to a thermosetting phenol resin soluble in alcohol and having a low molecular weight. The thermosetting conditions and the solvents used may be selected depending upon the type of thermosetting resins used.

In addition to the thermosetting resins, it may be possible to use any resin suitable for impregnation of the coating film layer and having a certain heat resistance (for instance 100° C., preferably 100° to 150° C. or higher selected depending upon the purpose) such as, for instance, polyamide, silicone resin, fluorine-containing resin, chlorinated vinyl chloride, polycarbonate and the like.

The thermosetting resins may be impregnated into the fine pores of the thin coating film by means of dip impreqnation, vacuum impregnation, vacuum/pressure impregnation. Resin impregnation may also be carried out (e.g., in vacuo) by other suitable means under suitable conditions, provided that any impregnation of impurities, etc. into the pores should be avoided.

Permanent Magnet Material Body

The rare earth element(s) R used in the permanent magnet material bodies of the present invention amounts to 10-30 at % of the overall composition wherein R represents at least one of Nd, Pr, Dy, Ho and Tb or a mixture of at least one of said five and at least one of La, Ce, Sm, Gd, Er, Eu, Tm, Yb, Lu, Pm and Y. Usually, it suffices to use one of said five R, but use may be made of mixtures of two or more R (mishmetal didymium, etc.) for the reasons of their easy availability, etc.

It is noted that R (as the starting material) may not be pure rare earth elements, but may contain impurities to be inevitably entrained from the process of production, as long as they are industrially available.

R is an element or elements inevitable in the novel permanent magnet materials based on the foregoing systems. However, in an amount of below 10 at % it is impossible to obtain permanent magnets having high magnetic properties, in particular high coercive force, since the cubic system of the same structure as alpha-iron biginns to occur. In an amount of higher than 30 at %, on the other hand, no excellent permanent magnets are obtained, since the proportion of R-rich nonmagnetic phases is increased, resulting in a drop of residual magnetic flux density (Br). Therefore, the amount of the rare earth element(s) is limited to a range of 10-30 at %.

B (boron) is an inevitable element in the permanent magnet materials of this invention. However, in an amount of lower than 2 at % it is impossible to obtain permanent magnets having high coercive force (iHC), since their major phase is of the rhombohedral structure. In an amount of higher than 28 at %, on the other hand, no practical permanent magnets are obtained, since the proportion of B-rich nonmagnetic phases is increased, resulting in a drop of residual magnetic flux density (Br). Therefore, the amount of B is limited to a range of 2–28 at %.

Note, however, these limitations are made in view of the practical level of the energy product of 4 MGOe.

Fe (iron) is an inevitable element in the novel permanent magnets based on the aforesaid systems and the balance is Fe (at least 42 at %). For (BH)max of at least 10 MGOe, a composition of 10–24 at % R wherein 50 at % of R is Nd and/or Pr, 4≧24 at % BN and the balance Fe (at least 52 at %) is suitable. Still higher (BH)max may be achieved in the preferred compositions.

12.5–20 at % R, 5–15 at % B and 65–82.5 at % Fe provide (BH)max of at least 20 MGOe. 13–18 at % R, 5–11 at % B and 67–82 at % Fe provide (BH)max of at least 30 MGOe. 6–11 at % B, 13–16 at % R and the balance Fe provide (BH)max of at least 35 MGOe. 6.5–7 at % B, 13.5–14 at % R and the balance being Fe provide (BH)max of at least 40 MGOe, ranging up to 45 MGOe. At least 80 at % of R should be Nd and/or Pr. For the highest energy product R should be Nd. An Fe amount of lower than 65 at % leads to a drop of residual magnetic flux density (Br) and at least 65at % is preferred. An Fe amount of higher than 80 at % gives no further increase in coercive force. Thus, the amount of Fe is preferably 65–80 at % in view of the coercive force.

In the permanent magnet materials of this invention, the substitution of a part of Fe with Co yields magnets having an improved temperature dependence (i.e., less dependent on temperature) through increase in the Curie temperature and the improved temperature coefficient of Br. However, it is . unpreferred that Co exceeds 20 at %, since there is then gradual deterioration of magnetic properties. To obtain high residual magnetic flux density, it is most preferred that the combined amount of Fe and Co is in a range of 5–15 at %, since Br is higher than that obtained in the absence of Co. However, in view of the temperature dependence, Curie temperature, and the corrosion resistance Co may be incorporated up to 45 at % substituted for a part of Fe wherein the remaining Fe should be at least 27 at %. Co may be present up to 35 at %, or 25 at % subject to the gradual change in Br.

By the same token, the permanent magnet materials according to this invention may contain, in addition to R, B and Fe, impurities which are inevitably entrained from the industrial process of production. Such impurities include C, P, S, Cu etc. which should be as little as possible, however, may be present up to about 1 at % in total, or strictly up to 0.1 at % in total.

At least one of the following additional elements M may be added to the R-B-Fe base permanent magnets, since they are effective in improving the coercive force, loop squareness of demagnetization curves and productivity thereof, or cut down the price thereof.

The additional elements M are:

no higher than 9.5 at % Al, no higher than 4.5 at % Ti,
no higher than 9.5 at % V, no higher than 8.5 at % Cr,
no higher than 8.0 at % Mn, no higher than 5.0 at % Bi,
no higher than 12.5 at % Nb, no higher than 10.5 at % Ta,
no higher than 9.5 at % Mo, no higher than 9.5 at % W,
no higher than 2.5 at % Sb, no higher than 7 at % Ge,
no higher than 3.5 at % Sn, no higher than 5.5 at % Zr,
no higher than 8.0 at % Ni, no higher than 9.0 at % Si,
no higher than 1.1 at % Zn, and no higher than 5.5 at % Hf.

The preferred amounts of the additional elements M are:

no higher than 6.4 at % Al, no higher than 3.3 at % Ti,
no higher than 6.6 at % V, no higher than 5.6 at % Cr,
no higher than 3.5 at % Mn, no higher than 5.0 at % Bi,
no higher than 10.0 at % Nb, no higher than 8.4 at % Ta,
no higher than 6.2 at % Mo, no higher than 5.9 at % W,
no higher than 1.4 at % Sb, no higher than 4.5 at % Ge,
no higher than 1.8 at % Sn, no higher than 3.7 at % Zr,
no higher than 4.5 at % Ni, no higher than 5.0 at % Si,
no higher than 0.5 at % Zn, and no higher than 3.7 at % Hf.

However, when two or more of the additional elements are contained, the highest total amount thereof is no higher than the at % of the element of the additional elements, that is actually added in the largest amount. It is thus possible to enhance the coercive force of the permanent magnets of this invention. The former amounts of M are defined to provide (BH)max of at least 4 MGOe, while the preferred amount of M are defined at (BH)max of at least 10 MGOe. Most preferred amounts of M are 0.1–3 at % in total.

In the production of sintered permanent magnets having excellent magnetic properties from finely divided and uniform alloy powders, it is inevitable that their crystal phase has its major phase consisting of the Fe-B-R type tetragonal crystal structure. The Fe-B-R type tetragonal crystal structure of the present invention has a central composition of $R_2Fe_{14}B$, or $R_2(Fe,Co)_{14}B$.

It is understood that the permanent magnets of this invention are made magnetically anisotropic by compacting in a magnetic field, and magnetically isotropic by compacting in the absence of any magnetic field.

The permanent magnet materials according to this invention show a coercive force iHc of at least 1 kOe, a residual magnetic flux density of at least 4 kG, and a maximum energy product (BH)max of at least 4 MGOe and reaching a high of 30, 35, 40 MGOe or more.

The present invention will now be explained in detail with reference to the following non-restricting examples.

EXAMPLES

Example 1

The starting materials used were electrolytic iron of 99.9% purity, a ferroboron alloy containing 19.4% B with the remainders being Fe and impurities such as Al, Si, C, etc., and Nd of 99.7% or higher purity. These materials were melted by high-frequency melting, and were thereafter cast in a water-cooled copper casting mold to obtain a cast ingot having a composition of 15Nd-8B-77Fe (in at %).

The ingot was coarsely pulverized in a stamp mill, and was then finely pulverized in a ball mill to obtain fine powders having a particle size of 3 micrometers.

The powders were charged into a metal mold, oriented in a magnetic field of 12 kOe, and were compacted in the direction parallel with the magnetic field at a pressure of 1.5 t/cm$^2$.

The thus obtained compact was sintered at 1100° C. for 1 hour in Ar, was then cooled off, and was further aged at 600° C. for 2 hours in Ar to prepare a permanent magnet.

Test pieces, each being 20 mm in outer diameter, 10 mm in inner diameter and 1.5 mm in thickness, were cut out of that permanent magnet.

One of the aforesaid test pieces was placed in a vacuum vessel with the degree of vacuum being $1\times10^{-5}$ Torr, and was pre-treated by heating at 350° C. for 30 minutes. The test piece was cooled down to 300° C. Thereafter, a Ni piece measuring 100 mm diameter×10 mm and having a purity of 99.99 % or higher for a coating material was irradiated with electron beams of 0.6 A and 8 kV for heating and evaporation whereby a thin film of Ni was vacuum-deposited onto the test piece.

The Ni thin film formed on the surface of the permanent magnet according to this invention was found to have a thickness of 5 micrometers.

With this test piece, corrosion resistance testing was carried out, and adhesion strength testing of the thin film was thereafter done. The magnetic properties of the test piece were also measured before and after corrosion resistance testing. The results of testing and measurement are set forth in Tables 1 and 2.

For the purpose of comparison, another test piece was solvent-degreased with trichlene for 3 minutes, and was alkali-degreased with 5% NaOH at 60° C. for 3 minutes. Thereafter, the piece was washed with 2% HCl at room temperature for 10 seconds, and was electroplated with nickel in a Watt bath at a current density of 4 $A/dm^2$ and a bath temperature of 60° C. for 20 minutes to obtain a control test piece (Comparison Example 1) having thereon a nickel plating layer of 10 microns in thickness. The same tests and measurement as in Example 1 were carried out with this control piece. Table 1 also shows the results.

In the corrosion resistance testing, the test pieces were allowed to stand for 500 hours in an atmosphere of a temperature of 60° C. and a humidity of 90% for the visual appreciation of the appearance thereof.

In the adhesion strength testing, an adhesive tape was applied on the test pieces which had been subjected to the corrosion resistance testing and provided with cells at pitch of 1 mm, and was peeled off to estimate whether or not the thin film layers were separated off (unpeeled cells/whole cells).

Example 2

The same test pieces as used in Example 1 was placed in a vacuum vessel having a degree of vacuum of $1\times10^{-5}$ Torr, and an Ar gas was introduced therein to a degree of vacuum of $1.2\times10^{-2}$ Torr. Discharge was then effected in the Ar gas at 150 W to sputter a target material formed of a Co-18.5Cr alloy piece for 5 hours, whereby a thin film of the same composition as the target material was formed on the surface of the test piece. The thin film formed on the surface of the test piece was found to have a thickness of 5 micrometers.

With this test piece, corrosion resistance testing and adhesion strength testing of the thin film were carried out in the procedures of Example 1. The magnetic properties of the test piece were also measured before and after the corrosion resistance testing. The results of tests and measurement are set forth in Tables 1 and 4.

Example 3

The same test piece as used in Ex. 1 was placed in a vacuum vessel having a degree of vacuum of $1\times10^{-5}$ Torr, and reverse sputtering was effected at a voltage of 400 V for 1 minute in an Ar gas of 0.8 Torr. The test piece was then pre-treated by heating at 350° C. for 30 minutes, and cooled down to 300° C. Thereafter, a target material formed of particulate molten quartz of 3–5 mm in size was heated to put that molten quartz into a molecular state. Thermoelectrons were collided with the molecular quartz for ionization. The ionized $SiO_2$ particles, traveling by an electrical field distribution, were collided with other evaporated particles to increase the number thereof. These ionized $SiO_2$ particles were attracted by an electrical field for deposition onto the test piece constituting a cathode, whereby a $SiO_2$ thin film was formed on the surface of the test piece. That film had a thickness of 5 micrometers.

Referring to the foregoing ion plating conditions, the test piece was treated at a voltage of 1 kV, an ionization voltage of 100 V and 80–90 mA for 40 minutes.

With this test piece, corrosion resistance testing and adhesion strength testing of the thin film were effected in the procedures of Ex. 1. The magnetic properties of the test piece were also measured before and after the corrosion resistance testing. The results of tests and measurement are set forth in Tables 1 and 3.

Example 4

The starting materials used were electrolytic iron of 99.9% purity, a ferroboron alloy containing 19.4% B with the remainders being Fe and impurities such as Al, Si, C, etc., and Nd and Dy each having a purity of 99.7% or higher. These materials were melted by high-frequency melting, and were thereafter cast in a water-cooled copper casting mold to obtain a cast ingot having a composition of 15Nd-1.5Dy-8B-75.5Fe (in at %). Thereafter, the ingot was coarsely pulverized in a stamp mill, and was then finely pulverized in a ball mill to obtain fine powders having particle size of 3 microns.

The powders were placed into a metal mold, oriented in a magnetic field of 12 kOe, and were compacted in the direction normal to the magnetic field at a pressure of 1.5 $t/cm^2$.

The thus obtained compact was sintered at 1100° C. for 1 hours in Ar, was then allowed to cool, and was further aged at 600° C. for 2 hours in Ar to prepare a permanent magnet.

Test pieces, each being 20 mm in outer diameter, 10 mm in inner diameter and 1.5 mm in thickness, were cut out of the obtained permanent magnet.

A Ti piece for a coating material was evaporated by arc discharging at a degree of vacuum of $1\times10^{-2}$ Torr or less in a vacuum vessel into which one of the aforesaid test piece was placed. In the meantime, a $N_2$ gas was accelerated as $N_2$ gas ions at an extraction voltage of 40 kV, an ionization current of 100 mA and a beam size of $4\times10$ $cm^2$ for Ti-evaporation and $N_2$ gas ion-irradiation for 3 hours, whereby a TiN thin film was formed on the surface of the test piece. The TiN thin film was then found to have a thickness of 5 micrometers.

The same corrosion resistance testing and adhesion strength testing of the thin film as mentioned in Ex. 1 were carried out with this test piece. The magnetic properties of the test piece were also measured before and after the corrosion resistance testing. The results of tests and measurement are set forth in Table 1.

For the purpose of comparison, another test piece was solvent-degreased with trichloroethylene for 3 minutes, and was alkali-degreased with 5% NaOH at 60° C. for 3 minutes. Thereafter, the piece was acid-washed with 2% HCl at room temperature for 10 seconds, and was electroplated with nickel in a Watt bath at a current density of 4 $A/dm^2$ and a bath temperature of 60° C. for 20 minutes to obtain a control test piece (Comparison Example 2) having thereon a nickel deposited layer of 10 micrometers in thickness. Like in Ex. 4, the same tests and measurement as in Ex. 1 were carried out with this control piece. Table 1 also shows the results.

Example 5

With the same test piece as used in Ex. 4, the plasma vapor deposition thin-film formation technique was applied for 3 hours to form a $SiO_2$ thin film of 5 micrometers in thickness on the surface thereof. More exactly, $SiH_4$ and $N_2O$ gases were simultaneously fed at a flow rate of 100 ml/min into a vacuum vessel having therein the test piece, and discharge was effected at 200 W with a high-frequency plasma of 13.56 MHz, thereby forming a $SiO_2$ thin film on the surface of the test piece preheated to 200° C.

The same corrosion resistance testing and adhesion strength testing of the thin film as mentioned in Ex. 1 were carried out with this test piece. The magnetic properties of the test piece were also measured before and after the corrosion resistance testing. The results of tests and measurement are set forth in Table 1.

As clearly appreciated from the results of tests and measurement set forth in Table 1, the anticorrosive vapor-deposited layers according to this invention have the required thickness and show a uniformity much better than do the control layers. It is thus appreciated that the permanent magnets of this invention are steadily protected against oxidation without an deterioration of the magnetic properties, and have the magnetic properties considerably improved over those of the control magnets.

TABLE 1

| | Thickness of vapor deposited thin film μm | Corrosion resistance testing (appearance) | Adhesion Strength test | Magnetic Properties: Before corrosion resistance test: Br kG | iHc kOe | (BH)max MGOe | After corrosion resistance test: Br kG | iHc kOe | (BH)max MGOe |
|---|---|---|---|---|---|---|---|---|---|
| Example 1 | | | | | | | | | |
| 1 | 5 | good | 52/52 | 11.4 | 13.1 | 30.2 | 11.4 | 13.2 | 30.3 |
| 2 | 5 | good | 52/52 | 11.5 | 13.2 | 30.6 | 11.5 | 13.2 | 30.5 |
| 3 | 5 | good | 52/52 | 11.4 | 13.2 | 30.3 | 11.4 | 13.2 | 30.2 |
| 4 | 5 | good | 52/52 | 11.2 | 18.4 | 31.6 | 11.2 | 18.3 | 31.5 |
| 5 | 5 | good | 52/52 | 11.3 | 18.2 | 32.0 | 11.2 | 18.0 | 31.8 |
| Comparison | | | | | | | | | |
| 1 | 10 | 0.1-1 mm rusting bulging | 15/52 peeling-off & rusting | 11.4 | 13.2 | 30.3 | 10.9 | 8.9 | 19.4 |
| 2 | 10 | 0.1-1 mm rusting bulging | 13/52 peeling-off & rusting | 11.2 | 18.4 | 31.6 | 11.0 | 14.5 | 22.2 |

Example 6

The same test piece as used in Ex. 1 was placed in a vacuum vessel having a degree of $3\times10^{-6}$ Torr, and was pre-treated by heating at 100° C. for 30 minutes. Thereafter, a Cr piece measuring 3 mm diameter×5 mm and having a purity of 99.99% or higher for a coating material was irradiated with electron beams of 0.02A and 5 kV for 1 hour for heating and evaporation, whereby a Cr thin film was formed on the surface of the test piece, which was found to have a thickness of 5 micrometers.

The same corrosion resistance testing and adhesion strength testing of the thin film as mentioned in Ex. 1 were carried out with this test piece. The magnetic properties of the test piece were also measured before and after the corrosion resistance testing. The results of tests and measurement are set forth in Table 2.

Example 7

The same test piece as used in Ex. 1 was placed in a vacuum vessel having a degree of vacuum of $5\times10^{-6}$ Torr, and was pre-treated by heating at 100° C. for 30 minutes. Thereafter, a molten quartz piece measuring 3 mm diameter×5 mm for a coating material was irradiated with electron beams of 0.04A and 5 kV for 1 hour for heating and evaporation, thereby forming a $SiO_2$ thin film on the surface of the test piece, which was found to have a thickness of 5 micrometers.

The same corrosion resistance testing and adhesion strength testing of the thin film as applied in Ex. 1 were carried out with this test piece. The magnetic properties of the test piece were also measured before and after the corrosion resistance testing. The results of tests and measurement are set forth in Table 2.

Example 8

The same test piece as used in Ex. 1 was placed in a vacuum vessel having a degree of vacuum of $5\times10^{-6}$ Torr, and was pre-treated by heating at 100° C. for 30 minutes. Thereafter, an Al piece measuring 3 mm diameter×5 mm and having a purity of 99.99% or higher for a coating material was irradiated with electron beams of 0.28A and 5 kV for 1 hour for heating and evaporation, thereby forming an aluminium thin film on the surface of the test piece, which was found to have a thickness of 5 micrometers.

The same corrosion resistance testing and adhesion strength testing of the thin film as applied in Ex. 1 were carried out with this test piece. The magnetic properties of the test piece were also measured before and after the corrosion resistance testing. The results of tests and measurement are set forth in Table 2.

As clearly appreciated from the results of tests and measurement set forth in Table 2, the anticorrosive thin films according to the vacuum deposition technique have the required thickness and show a uniformity much better than do the control film. It is thus appreciated that the permanent magnets of this invention are steadily protected against oxidation without any deterioration of the magnetic properties, and have the magnetic properties considerably improved.

TABLE 2

(Vacuum Deposition)

| | Thickness of vapor deposited thin film μm | Corrosion resistance testing (appearance) | Adhesion Strength test | Magnetic Properties: Before corrosion resistance test Br kG | iHc kOe | (BH)max MGOe | After corrosion resistance test Br kG | iHc kOe | (BH)max MGOe |
|---|---|---|---|---|---|---|---|---|---|
| Example 1 | | | | | | | | | |
| 1 | 5 | good | 52/52 | 11.4 | 13.1 | 30.2 | 11.4 | 13.2 | 30.3 |
| 6 | 5 | good | 52/52 | 11.5 | 13.2 | 30.6 | 11.5 | 13.1 | 30.5 |
| 7 | 5 | good | 52/52 | 11.4 | 13.2 | 30.3 | 11.4 | 13.0 | 30.2 |
| 8 | 5 | good | 52/52 | 11.4 | 13.2 | 30.2 | 11.4 | 13.1 | 30.2 |
| Comparison 1 | 10 | ↓ 0.1-1 mm rusting & bulging | 13/52 | 11.4 | 13.2 | 30.3 | 10.9 | 8.9 | 19.4 |

Example 9

The same test piece as used in Ex. 1 was placed in a vacuum vessel having degree of vacuum of $1\times10^{-5}$ Torr, and reverse sputtering was effected at a voltage of 400V for 1 minute in a $N_2$ gas of $10^{-2}$ Torr. The test piece was then pre-treated by heating at 350° C. for 30 minutes, and was cooled down to 300° C. A coating material formed of a Ti piece measuring 5 mm diameter×3 mm and having a purity of 99.99% was heated to put it into an atomic state. Thermoelectrons were collided with the atomic Ti for ionization. The ionized TiN particles, traveling by an electrical field distribution, were collided with other evaporated particles to increase the number thereof. These ionized TiN particles were attracted by an electrical field for deposition onto the test piece constituting a cathode, thereby forming a TiN thin film found to have a thickness of 5 micrometers.

Referring to the aforesaid ion plating conditions, the test piece was treated at a voltage of 1 kV, an ionization voltage of 100V and 40-60 mA for 20 minutes.

The same corrosion resistance testing and adhesion strength testing of the thin film as applied in Ex. 1 were carried out with this test piece. The magnetic properties of the test piece were also measured before and after the corrosion resistance testing. The results of tests and measurement are set forth in Table 3.

Example 10

The same test piece as used in Ex. 1 was placed in a vacuum vessel having a degree of vacuum of $1\times10^{-5}$ Torr, and reverse sputtering was effected at a voltage of 400V for 1 minute in a $CO_2$ gas of $10^{-2}$ Torr. The test piece was then pre-treated by heating at 350° C. for 30 minutes, and was cooled down to 300° C. A coating material formed of a Ti piece measuring 5 mm diameter×3 mm and having a purity of 99.99% was heated to put it into an atomic state. Thermoelectrons were collided with the atomic Ti for ionization. The ionized TiC particles, traveling by an electrical field distribution, were collided with other evaporated particles to increase the number thereof. These ionized TiC particles were attracted by an electrical field for deposition onto the test piece defining a cathode, thereby forming a TiC thin film. The thin film formed on the surface of the test piece was found to have a thickness of 5 microns.

Referring to the aforesaid ion plating conditions, the test piece was treated at a voltage of 1 kV, an ionization voltage of 100V and 40-60 mA for 20 minutes.

The same corrosion resistance testing and adhesion strength testing of the thin film as applied in Ex. 1 were carried out with this test piece. The magnetic properties of the test piece were also measured before and after the corrosion resistance testing. The results of tests and measurement are set forth in Table 3.

As clearly appreciated from the results of tests and measurement set forth in Table 3, the anticorrosive thin films according to the ion plating technique have the required thickness and show a uniformity much better than do the control film. It is thus appreciated that the permanent magnets of this invention are well protected against oxidation without any deterioration of the magnetic properties, and have the magnetic properties considerably improved.

TABLE 3

(Ion Plating)

| | Thickness of vapor deposited thin film μm | Corrosion resistance testing (appearance) | Adhesion Strength test | Magnetic Properties: Before corrosion resistance test Br kG | iHc kOe | (BH)max MGOe | After corrosion resistance test Br kG | iHc kOe | (BH)max MGOe |
|---|---|---|---|---|---|---|---|---|---|
| Example 1 | | | | | | | | | |
| 3 | 5 | good | 52/52 | 11.4 | 13.2 | 30.3 | 11.4 | 13.2 | 30.2 |
| 9 | 5 | good | 52/52 | 11.4 | 13.2 | 30.3 | 11.4 | 13.1 | 30.3 |
| 10 | 5 | good | 52/52 | 11.4 | 13.1 | 30.5 | 11.5 | 13.1 | 30.5 |
| Comparison 1 | 10 | ↓ 0.1-1 mm rusting & bulging | 15/52 | 11.4 | 13.2 | 30.3 | 10.9 | 8.9 | 19.4 |

Example 11

The same test piece as used in Ex. 1 was placed as an anode in a vacuum vessel having a degree of vacuum of $5\times10^{-6}$ Torr, and an Ar gas was introduced therein to a degree of vacuum of $0.8\times10^{-3}$ Torr. A voltage of 150W was applied between electrodes for discharge to sputter a cathode target material formed of a Ni material measuring 100 mm diameter×5 mm and having a purity of 99.99% for 5 hours, whereby a thin film having the same composition as the target material was formed on the surface of the test piece. The thin film formed on the surface of the test piece was found to have a thickness of 5 micrometers.

The same corrosion resistance testing and adhesion strength testing of the thin film as mentioned in Ex. 1 were carried out with this coated test piece. The magnet properties of test piece were also measured before and after the corrosion resistance testing. The results of tests and measurement are set forth in Table 4.

Example 12

The same test piece as used in Ex. 1 was placed as an anode in a vacuum vessel having a degree of vacuum of $5\times10^{-6}$ Torr, and an Ar gas was introduced therein to a degree of vacuum of $1.2\times10^{-2}$ Torr. A voltage of 170W was applied between electrodes for discharge to sputter a cathode target material formed of a $SiO_2$ material measuring 100 mm diameter×5 mm and a purity of 99.99% for 3 hours, whereby a thin film having the same composition as the target material was formed on the surface of the test piece. The thin film formed on the surface of the test piece was found to have a thickness of 5 micrometers.

The same corrosion resistance testing and adhesion strength testing of the thin film as applied in Ex. 1 were carried out with this test piece. The magnetic properties of the test piece were also measured before and after the corrosion resistance testing. The results of tests and measurement are set forth in Table 4.

As clearly appreciated from the results of tests and measurement set forth in Table 4, the anticorrosive thin films according to sputtering have the required thickness and show a uniformity much better than do the control film. I is thus appreciated that the permanent magnets of this invention are well protected against oxidation without any deterioration of the magnetic properties, and have the magnetic properties considerably improved.

TABLE 4

(Sputtering)

| | Thickness of vapor deposited thin film μm | Corrosion resistance testing (appearance) | Adhesion Strength test | Magnetic Properties: Before corrosion resistance test Br kG | iHc kOe | (BH)max MGOe | After corrosion resistance test Br kG | iHc kOe | (BH)max MGOe |
|---|---|---|---|---|---|---|---|---|---|
| Example 1 | | | | | | | | | |
| 2 | 5 | good | 52/52 | 11.5 | 13.2 | 30.6 | 11.5 | 13.2 | 30.5 |
| 11 | 5 | good | 52/52 | 11.4 | 13.3 | 30.3 | 11.4 | 13.2 | 30.2 |
| 12 | 5 | good | 52/52 | 11.4 | 13.2 | 30.2 | 11.4 | 13.1 | 30.2 |
| Comparison 1 | 10 | ↓ | 15/52 | 11.4 | 13.2 | 30.3 | 10.9 | 8.9 | 19.4 |
| | | 0.1-1 mm rusting & bulging | | | | | | | |

Example 13

The starting materials used were electrolytic iron of 99.9% purity, a ferroboron alloy and Nd of 99.7% of higher purity. These materials were formulated and melted by high-frequency melting. Thereafter, the melt was cast in a water-cooled copper casting mold to obtain a cast ingot having a composition of 16.0Nd-7.0B-77.0Fe.

Thereafter, the ingot was coarsely pulverized in a stamp mill, and was finely pulverized in a ball mill to obtain fine powders having a mean particle size of 2.8 micrometers.

The fine powders were placed in a metal mold, oriented in a magnetic field of 15 kOe, and were compacted at a pressure of 1.2 t/cm² in the direction parallel with the magnetic field.

The obtained compact was sintered at 1100° C. for 1 hour in an Ar atmosphere to obtain a sintered body of 25 mm in length, 40 mm in width and 30 mm in thickness.

The sintered body was further subjected to a two-stage aging treatment at 800° C. for 1 hour and at 630° C. for 1.5 hours.

Test pieces, each being 5 mm in length, 10 mm in width and 3 mm in thickness, were cut out of the thus obtained permanent magnet at 2400 rpm and a feed rate of 5 mm/min in the atmosphere, using a diamond No. 200 grinder.

For blasting, glass beads (Comparison Examples) and $Al_2O_3$ powders (Examples)—the powders for blasting—were blasted together with air pressurized to 4 kgf/cm² onto the test pieces for 7-10 minutes, as stated in Table 5, to remove surface layers therefrom.

The magnetic properties of each test piece were measured before and after blasting. Table 5 shows the processing conditions and the results of measurement.

The results of Table 5 clearly indicate that the processings according to this invention eliminate any deterioration of the magnetic properties of the sintered magnet body, which otherwise takes place due to black skins remaining thereon and oxidation or deteriorated layers formed by finish machining.

TABLE 5

| Sample | Blasting Conditions: Blasting Powders | Particle Size μm | Pressure kg/cm² | Time min. |
|---|---|---|---|---|
| Comparison | | | | |
| 3 | as processed | | | |
| 4 | glass beads | 105 | 4 | 10 |
| 5 | glass beads | 210 | 4 | 7 |
| Examples | | | | |
| 13-1 | $Al_2O_3$ system | 105 | 4 | 10 |
| 13-2 | $Al_2O_3$ system | 210 | 4 | 7 |

| Sample | Br kG | iHc kOe | (BH)max MGOe |
|---|---|---|---|
| Comparison | | | |
| 3 | 11.5 | 10.4 | 30.4 |
| 4 | 11.5 | 10.3 | 30.4 |
| 5 | 11.5 | 10.2 | 30.3 |
| Examples | | | |
| 13-1 | 11.8 | 10.5 | 32.0 |
| 13-2 | 11.7 | 10.5 | 32.1 |

Example 14

The starting materials used were electrolytic iron of 99.9% purity, a ferroboron alloy and Nd of 99.7% or higher purity. These materials were formulated and melted by high-frequency melting. Thereafter, the melt was cast in a water-cooled copper casting mold to obtain a cast ingot having a composition of 16.0Nd-7.0B-77.0Fe (atomic %).

Thereafter, the ingot was coarsely pulverized in a stamp mill, and was finely pulverized in a ball mill to obtain fine powders having a mean particle size of 2.8 micrometers.

The fine powders were placed in a metal mold, oriented in a magnetic field of 15 kOe, and were compacted at a pressure 1.2 t/cm$^2$ in the direction parallel with the magnetic field.

The obtained compact was sintered at 1100° C. for 1 hour in an Ar atmosphere to obtain a sintered body of 25 mm in length, 40 mm in width and 30 mm in thickness.

The sintered body was further subjected to a two-stage aging treatment at 800° C. for 1 hour and at 630° C. for 1.5 hours.

Test pieces each being 5 mm in length, 10 mm in width and 3 mm in thickness were cut out of the thus obtained permanent magnet at 2400 rpm and a feed rate of 5 mm/min in the atmosphere, using a diamond No. 200 grinder.

$Al_2O_3$ hard powders having a mean particle size of 50 microns and a Mohs hardness of 12 were blasted together with a $N_2$ gas pressurized to 3.0 kgf/cm$^2$ onto one of the test pieces for 15 minutes for grit blasting to remove a surface layer therefrom.

Next, the aforesaid test piece was placed in a vacuum vessel having a degree of vacuum of $5\times10^{-5}$ Torr, into which an Ar gas was fed. Subsequently to 20 minute-discharge at a voltage of 400V in an Ar gas of $1\times10^{-2}$ Torr, a coating material formed of an Al plate of 99.99% purity was heated for the ionization of evaporated Al. The thus ionized particles were attracted by an electrical field for deposition onto the test piece forming a cathode, thereby forming an Al thin film. The thin film formed on the surface of the test piece was found to having a thickness of 20 micrometers.

The foregoing ion plating conditions were a voltage of 1.5 kV and a treating time of 15 minutes.

With this test piece, corrosion resistance testing was carried out, and adhesion strength testing of the thin film was done thereafter. The magnetic properties of the test piece were also measured before and after the corrosion resistance testing. The results of tests and measurement are set forth in Table 6.

For the purpose of comparison, another test piece was solvent-degreased with trichlene for 3 minutes, and was alkali-degreased with 5% NaOH at 60° C. for 3 minutes. Thereafter, the piece was acid-washed with 2% HCl at room temperature for 10 seconds, and was electroplated with nickel in a Watt bath at a current density of 4 A/dm$^2$ and a bath temperature of 60° C. for 20 minutes to obtain a control test piece (Comparison Example 7) having thereon a nickel plating layer of 20 microns in thickness. The same tests and measurement as in Ex. 14 were carried out with this control piece. The results are also given in Table 6.

In the corrosion resistance testing, the test pieces were allowed to stand for 200 hours in an atmosphere of a temperature of 60° C. and a humidity of 90% for the visual estimation of the appearance thereof.

In the adhesion strength testing, the test pieces which had been subjected to the corrosion resistance testing were ruptured for the visual estimation of the rupture cross-sections thereof.

The results of Table 6 clearly indicate that the method of this invention eliminate any deterioration of the permanent magnets, which otherwise takes place in association with cutting or grinding, and are thus very effective in providing permanent magnets having improved corrosion resistance.

TABLE 6

| | | | Magnetic Properties | | | | | |
|---|---|---|---|---|---|---|---|---|
| | | | Before corrosion resistance test | | | After corrosion resistance test | | |
| Sample | Corrosion resistance testing (appearance) | Adhesion Strength test | Br kG | iHc kOe | (BH)max MGOe | Br kG | iHc kOe | (BH)max MGOe |
| Example 14 Grit blasting + Al thin film layer* | no rusting | no peeling-off good | 11.7 | 10.5 | 32.3 | 11.7 | 10.5 | 32.2 |
| Comparison Ex. 6 Grit blasting as processed | marked rusting | — | 11.5 | 10.3 | 30.4 | — | — | — |
| Comparison Ex. 7 Grit blasting + Ni plating** | rusting peeling-off | easy peeling-off | 11.5 | 10.4 | 30.4 | 11.4 | 8.2 | 17.5 |

*Vapor deposition
**Electroplating

Example 15

The starting materials used were electrolytic iron of 99.9% purity, a ferroboron alloy and Nd of 99.7% or higher purity. These materials were formulated and melted by high-frequency melting. Thereafter, the melt cast in a water-cooled copper casting mold to obtain a cast ingot having a composition of 16.0Nd-7.0B-77.0Fe.

Thereafter, the ingot was coarsely pulverized in a stamp mill, and was finely pulverized in a ball mill to obtain fine powders having a mean particle size of 2.8 micrometers.

The fine powders were placed in a metal mold, oriented in a magnetic field of 15 kOe, and were compacted at a pressure 1.2 t/cm$^2$ in the direction normal to the magnetic field.

The obtained compact was sintered at 1100° C. for 1 hour in an Ar atmosphere to obtain a sintered body for 25 mm in length, 40 mm in width and 30 mm in thickness.

The sintered body was further subjected to a two-stage aging treatment at 800° C. for 1 hour and at 630° C. for 1.5 hours.

Test pieces, each being 5 mm in length, 10 mm in width and 3 mm in thickness, were cut of the thus obtained permanent magnet at 2400 rpm and a feed rate of 5 mm/min in the atmosphere, using a diamond No. 200 grinder.

$Al_2O_3$ hard powders of the random shape having a mean particle size of 50 micrometers and a Mohs hardness of 9 were blasted together with a $N_2$ gas pressurized to 2.5 kgf/cm$^2$ onto one of the test pieces for 20 minutes for blasting to remove a surface layer therefrom.

Next, the aforesaid test piece was placed in a vacuum vessel having a degree of vacuum of $5\times10^{-5}$ Torr, into which an Ar gas was fed. Subsequently to 15 minute-discharge at a voltage of 500V in an Ar gas of $1\times10^{-2}$ Torr, a coating material formed of an Al plate of 99.99% purity was heated for the ionization of evaporated Al. The thus ionized particles were attracted by an electrical field for deposition onto the test piece forming a cathode, thereby forming an Al thin film. The thin film formed on the surface of the test piece was found to have a thickness of 15 micrometers.

The aforesaid ion plating conditions were a voltage 1.5 kV and a treating time of 10 micrometers.

Powders of spherical glass beads having a mean particle size of 120 micrometers and a Mohs hardness of 6 were blasted together with a $N_2$ gas pressurized to 1.5 kgf/cm$^2$ onto the Al thin film-deposited test sample for 5 minutes for shot peening, thereby preparing a test piece (Example 15-1).

After shot peening, the magnet sample was immersed in a 2% AROGINE No. 1200 (Trade Name; manufactured by Nippon Paint) solution maintained at 30° C. for 1 minute to deposit a golden chromate thin film onto the surface of the Al thin film layer after peening, thereby obtaining a test piece (Example 15-2).

With these test pieces, corrosion resistance testing was carried out, and adhesion strength testing of the thin films was thereafter done. The magnetic properties of the test pieces were also measured before and after the corrosion resistance testing. The results of tests and measurement are set forth in Table 7.

For the purpose of comparison, the as-cut test piece (Comparison Example 8) and the aforesaid test piece were solvent-degreased with trichlene for 3 minutes, and was alkali-degreased with 5% NaOH at 60° C. for 3 minutes. Thereafter, the pieces were acid-washed with 2% HCl at room temperature for 10 seconds, and was electroplated with nickel in a Watt bath at a current density of 4 A/dm$^2$ and a bath temperature of 60° C. for 20 minutes to obtain control test pieces (Comparison Example 9) having thereon a nickel plating layer of 20 micrometers in thickness.

The same tests and measurements as in Ex. 15 were carried out with these control test pieces. The results are also given in Table 7.

In the corrosion resistance testing, the test pieces were allowed to stand for 500 hours in an atmosphere of a temperature of 70° C. and a humidity of 90% for the visual estimation of the appearance and adhesion thereof. This testing was also estimated in terms of the magnetic properties of the test pieces before and after the corrosion resistance testing. Measurement was made of a time by which the test pieces were rusted under the aforesaid conditions.

In the adhesion strength testing, the test pieces 15-1 and 15-2 of this invention and the control test pieces 9, which had been subjected to the corrosion resistance testing, were ruptured to examine the rupture cross-sections thereof.

Table 7 clearly indicates that the method of this invention eliminates any deterioration of the permanent magnets, which otherwise takes place in association with cutting or grinding, and are thus very effective in providing permanent magnets having improved corrosion resistance.

TABLE 7

| | Sample | Corrosion resistance testing (appearance) | Adhesion strength test | Magnetic Properties: Before corrosion resistance test: Br kG | iHc kOe | (BH)max MGOe | After corrosion resistance test: Br kG | iHc kOe | (BH)max MGOe | Time by rusting |
|---|---|---|---|---|---|---|---|---|---|---|
| Invention | 15-1 Grit blasting + Al thin film layer* + shot peening | no rusting | no peeling-off good | 12.2 | 11.0 | 35.1 | 12.2 | 11.0 | 35.1 | local rusting after 800 hours |
| | 15-2 Grit blasting + Al thin film layer* + shot peening + chromate treatment | no rusting | no peeling-off good | 12.2 | 11.1 | 35.2 | 12.2 | 11.1 | 35.2 | no rusting after 1000 hours |
| Control Ex. | 8 as processed | marked rusting | — | 12.3 | 11.1 | 35.5 | | | | — |
| | 9** Grit blasting + Ni plating | rusting peeling-off | easy peeling-off | 11.5 | 10.4 | 34.5 | — | — | — | — |

*Vapor deposition
**Electroplating

Example 16

Electrolytic iron of 99.9% purity, a ferroboron alloy and Nd of 99.7% or higher purity used as the starting materials were formulated together, molten by high-frequency induction, and were thereafter cast in a water-cooled copper casting mold to obtain an cast ingot having composition of 15.0Nd8.0B77.0Fe (at %).

Thereafter, the ingot was coarsely pulverized in a stamp mill, and was then finely pulverized in a ball mill into fine powders having a mean particle size of 3 micrometers.

The thus obtained powders were charged in a mold, oriented in a magnetic field of 12 kOe, and were compacted at a pressure 1.5 t/cm$^2$ in the direction normal to the magnetic field.

The obtained green compact was sintered at 1100° C. for 1 hour in an Ar atmosphere to obtain a sintered body measuring 25 mm in length, 40 mm in width and 30 mm in thickness.

The thus sintered body was subjected to the two-stage aging of 800° C.×1 hour and 630° C.×1.5 hours in Ar.

With the use of a grinding wheel of diamond No. 200, the thus obtained permanent magnet body was cut at 2400 rpm and a feed rate of 5 mm/min in the atmosphere to prepare a sample of 5 mm in length, 10 mm in width and 3 mm in thickness.

The sample was then subjeted to blasting by blasting hard powders of $Al_2O_3$ of random shape having a mean particle size of 50 micrometers and a Mohs hardness of 9 along with a $N_2$ gas pressurized to 2.5 kgf/cm$^2$ to remove the surface layer therefrom.

Subsequently, the sample was placed in a vacuum vessel having a degree of vacuum $5\times10^{-5}$ Torr, into which an Ar gas was supplied for 15 minute-discharge at a voltage of 500V. Subsequently thereafter, a coating material formed of an Al plate of 99.99% purity was heated for the ionization of vaporized Al. The thus ionized particles were attracted by an electric field, and were deposited onto the test piece defining a cathode to form an Al thin film, which was found to have a thickness of 15 micrometers.

The aforesaid ion plating was carried out at a voltage of 1.5 kV for 10 minutes.

Further, the magnet sample with the deposited Al thin film layer was subjected to shot peening for blasting powders of spherical glass beads having a mean particle size of 120 microns and a Mohs hardness of 6 along with a $N_2$ gas pressurized to 1.5 kgf/cm$^2$ for 5 minutes to obtain a test piece.

The thus obtained test piece was impregnated with a thermosetting resin (manufactured by Hitachi Kasei K.K. under the trade name of HITANOL) for 3 minutes (Ex. 16-1) and 5 minutes (Ex. 16-2) in a vacuum vessel of $10^{-2}$ Torr. After impregnation, the test piece was washed on the surface with a solvent, dried at 25° C., and was thermally set at 140° C. for 30 minutes in the atmosphere.

Tests were conducted to measure the corrosion resistance of the test pieces and the adhesion strength of the thin films after the corrosion resistance test. Measurement was also made of the magnetic properties of the test pieces after and before the corrosion resistance test.

The results of testing and measurement are set forth in Table 8.

For the purpose of comparison, provision was made of a test piece (Comparison Example 16-1) prepared under the same conditions as in the present invention, except that any resin impregnation was not carried out, and an as-cut test pieces (Comparison Example 16-2) as mentioned in the foregoing. A further comparison test piece (Comparison Example 16-3) was obtained by degreasing the test piece of (Comparison Example 16-2) with a solvent trichloroethylene for 3 minutes and 5% NaOH (alkali-decreasing) at 60° /C. for 3 minutes, washing the thus degreased piece with 2% HCl (acid-washing) at room temperature for 10 seconds, and electroplating the thus washed piece with nickel at a current density of 4 A/dm$^2$ and a bath temperature of 60° C. for 20 minutes in a Watt bath to give a nickel-plated coating layer having a thickness of 20 micrometers.

Tests were conducted to measure the corrosion resistance of the test pieces and the adhesion strength of the thin films after the corrosion resistance test. Measurement was also made for the magnetic properties of the test pieces before and after the corrosion resistance test.

The results are also set forth in Table 8.

Estimation of corrosion resistance testing was made in terms of the appearance and adhesion strength of the test pieces allowed to stand in an atmosphere of a temperature of 70° C. and a humidity of 90% for 1000 hours as well as the magnetic properties of the test pieces before and after the corrosion resistance test.

Estimation of adhesion strength testing was made in terms of visual appreciation of the rupture section of each of the test pieces of Example 16-1 and 2 and Comparison Examples 16-1 and 3 after the corrosion resistance test.

TABLE 8

| | | | | Magnetic Properties | | | | | |
|---|---|---|---|---|---|---|---|---|---|
| | | | | Before corrosion resistance test | | | After corrosion resistance test | | |
| | Sample | Corrosion resistance testing (appearance) | Adhesion strength test | Br kG | iHc kOe | (BH)max MGOe | Br kG | iHc kOe | (BH)max MGOe |
| Invention | Example 16-1 Thermosetting resin impregnation time 3 minutes | no rusting over 1000 hr. | no peeling of thin film good | 12.2 | 11.0 | 35.2 | 12.2 | 11.0 | 35.1 |
| | Example 16-2 Thermosetting resin impregnation time 5 minutes | no rusting over 1000 hr. | no peeling of thin film good | 12.2 | 11.0 | 35.2 | 12.1 | 11.1 | 35.0 |
| Comparison | Example 16-1* | local rusting after 800 hr. | no peeling of thin film good | 12.2 | 11.1 | 35.2 | 12.1 | 11.1 | 35.0 |
| | Example 16-2 | marked rusting | — | 12.2 | 11.1 | 35.2 | — | — | — |
| | Example 16-3 | rusting peeling off of plated | easy peeling of plated coating | 11.3 | 10.3 | 34.3 | — | — | — |

TABLE 8-continued

| Sample | Corrosion resistance testing (appearance) | Adhesion strength test | Magnetic Properties Before corrosion resistance test Br kG | iHc kOe | (BH)max MGOe | After corrosion resistance test Br kG | iHc kOe | (BH)max MGOe |
|---|---|---|---|---|---|---|---|---|
| | coating | | | | | | | |

*The test piece with the asterisk belongs to the present invention, but is herein designated as the comparison example for the purpose of convenience at this embodiment. The same applies for Table 9 and 10.

Example 17

A magnet sample was obtained by repeating the procedures of Example 16, followed by peening. That sample was dipped into a 2% arosin No. 1200 (trade name, manufactured by Nippon Paint K.K.) solution maintained at 30° C. to deposit a golden chromate coating film onto the surface of the Al thin film layer treated by shot peening to thereby obtain a test piece.

The thus obtained test piece was impregnated with a thermosetting resin (manufactured by Hitachi Kasei K.K. under the trade name of HITANOL) for 3 minutes (Ex. 17-1) and 5 minutes (Ex. 17-2) in a vacuum vessel of $10^{-2}$ Torr. After impregnation, the test piece was washed on the surface with a solvent, dried at 25° C., and was thermally set at 140° C. for 30 minutes in the atmosphere.

Tests were conducted to measure the corrosion resistance of the test pieces and the adhesion strength of the thin films after the corrosion resistance test. Measurement was also made of the magnetic properties of the test pieces before and after the corrosion resistance test.

The results of testing and measurement are set forth in Table 9.

For the purpose of comparison, provision was made of a test piece (Comparison Example 17-1) prepared under the same conditions as in the present invention, except that any resin impregnation was not carried out, and an as-cut test piece (Comparison Example 17-2) as mentioned in the foregoing. A further comparison test piece (Comparison Example 17-3) was obtained by degreasing the test piece of (Comparison Example 17-2) with a solvent trichloroethylene for 3 minutes and 5% NaOH (alkali-degreasing) at 60° C. for 3 minutes, washing the thus degreased piece with 2% HCl (acid-washing) at room temperature for 10 seconds, and electroplating the thus washed piece with nickel at a current density of 4 A/cm² and a bath temperature of 60° C. for 20 minutes in a Watt bath to give a nickel-plated coating layer having a thickness of 20 microns.

Tests were conducted to measure the corrosion resistance of the test pieces and the adhesion strength of the thin films after the corrosion resitance test. Measurement was also made of the magnetic properties of the test pieces before and after the corrosion resistance test.

The results are set forth in Table 9.

Estimation of corrosion resistance testing was made in terms of the appearance and adhesion strength of the test pieces allowed to stand in an atmosphere of a temperature of 80° C. and a humidity of 90% for 1000 hours as well as the magnetic properties of the test pieces before and after the corrosion resistance test.

Estimation of adhesion strength testing was made in terms of visual appreciation of the rupture section of each of the test pieces of Examples 17-1 and 2 and Comparison Examples 17-1 and 3 after the corrosion resistance test.

TABLE 9

| | Sample | Corrosion resistance testing (appearance) | Adhesion strength test | Magnetic Properties Before corrosion resistance test Br kG | iHc kOe | (BH)max MGOe | After corrosion resistance test Br kG | iHc kOe | (BH)max MGOe |
|---|---|---|---|---|---|---|---|---|---|
| Invention | Example 17-1 Thermosetting resin impregnation time 3 minutes | no rusting over 1000 hr. | no peeling of thin film good | 12.3 | 11.1 | 35.4 | 12.3 | 11.0 | 35.2 |
| | Example 17-2 Thermosetting resin impregnation time 5 minutes | no rusting over 1000 hr. | no peeling of thin film good | 12.2 | 11.0 | 35.2 | 12.1 | 11.1 | 35.1 |
| Comparison | Example 17-1* | local rusting after 700 hr. | no peeling of thin film good | 12.2 | 11.1 | 35.3 | 12.1 | 11.1 | 35.1 |
| | Example 17-2 | marked rusting | — | 12.2 | 11.1 | 35.3 | — | — | — |
| | Example 17-3 | rusting peeling off of plated coating | easy peeling of plated coating | 11.2 | 10.4 | 34.4 | — | — | — |

Example 18

Electrolytic iron of 99.9% purity, a ferroboron alloy consisting of 19.4% B and the balance being Fe and impurities such as Al, Si and C and Nd of 99.7% or higher purity used as the starting materials were formulated together, molten by high-frequency induction, and were thereafter cast in a water-cooled copper casting mold to obtain a cast ingot having a composition of 16.0Nd7.0B77.0Fe (by atomic %).

Thereafter, the ingot was coarsely pulverized in a stamp mill, and was then finely pulverized in a ball mill into fine powder having a particle size of 2.8 micrometers.

The powders were placed in a mold, oriented in a magnetic field of 15 kOe, and were compacted at a pressure of 1.2 $t/cm^2$ in the direction normal to the magnetic field.

The thus obtained green compact was sintered at 1100° C. for 1 hour in an Ar atmosphere, was thereafter cooled off, and was further aged at 600° C. for 2 hours to prepare a permanent magnet.

Seven test pieces of 20 mm in outer diameter, 10 mm in inner diameter and 1.5 mm in thickness, were cut out of the thus obtained permanent magnet.

The test pieces were each placed in a vacuum vessel having a degree of vacuum of $1 \times 10^{-5}$ Torr, and reversely sputtered at a voltage of 400V for 1 minute in an Ar gas of 0.8 Torr. Thereafter, the test piece was heated to 350° C. for 30 minutes, and was cooled down to −300° C. as the pre-treatments.

Further, a coating material formed of an Al piece of 99.99% or higher purity and 10 mm diameter × 10 mm was exposed to electron beams of 0.6A and 8 kV for 30 minutes for heating and evaporation, whereby an aluminium thin film was deposited onto the test piece. The aluminium thin film formed on the surface of the permanent magnet was found to have a thickness of 10 micrometers.

The test piece with the deposited Al thin film was heat-treated for 1.5 hours under the conditions specified in Table 10.

Testing was conducted to measure the corrosion resistance of the test piece and the adhesion strength of the Al thin film after the corrosion resistance test. A magnetic flux drop (%) of the test piece was also measured after the corrosion resistance test. The results of testing and measurement are set forth in Table 10.

In the case of Sample Nos. 18-4 and 18-5, the respective tests and measurements were carried out after aging had been again at 600° C. for 2 hours following the heat treatment.

For the purpose of comparison, the same tests were carried out with a test piece (Comparison Example 18-1) prepared under the same conditions as mentioned above, except that no heat treatment was effected, and an as-cut test piece (Comparison Example 18-2). The results of testing and measurement are also set forth in Table 10.

Estimation of corrosion resistance testing was made in terms of the appearance of the test pieces allowed to stand in atmosphere of a temperature of 80° C. and a humidity of 90% for 175 hours.

Estimation of adhesion strength testing was made in terms of whether or not the thin film layer was peeled off, when the test piece provided thereon with 1 mm pitch cells were pulled up by an adhesive tape after the corrosion resistance test (i.e., unpeeled cells/all the cells).

The thickness of the diffusion layer was measured with an X-ray microanalyzer.

TABLE 10

| Sample No. | Heat treatment temp. | Diffusion layer thickness | Adhesion strength | Magnetic flux drop $\phi$ loss % | Corrosion resistance test |
|---|---|---|---|---|---|
| Invention | | | | | |
| 18-1 | 400° C. | 0.1 μm | 15/15 | 0.75 | good appearance |
| 18-2 | 500° C. | 0.2 μm | 15/15 | 0.79 | good appearance |
| 18-3 | 600° C. | 0.3 μm | 15/15 | 0.43 | good appearance |
| 18-4 | 700° C. | 1.0 μm | 15/15 | 0.43 | good appearance |
| 18-5 | 800° C. | 1.5 μm | 15/15 | 0.26 | good appearance |
| Comparison | | | | | |
| 18-1* | — | 0 | 15/15 | 3.85 | good appearance |
| 18-2 | — | — | — | 20.5 | 0.1-1 mm rusting & bulging |

As can clearly be understood from the results of Table 10, the permanent magnets of the present embodiment are positively prevented from oxidation, suffer no deterioration of the magnetic properties, and are more considerably improved in terms of the magnetic properties, as compared with the comparison examples, since the corrosion-resistant vapor-deposited coating layer according to the 5th aspect of the present invention includes a diffusion layer obtained by the heat treatment.

It should be noted that the Fe-B-R base sintered permanent magnet per se is disclosed in the European Publication of Applications as mentioned hereinbefore thus not disclosed herein in detail. The disclosure in those European publications should be referred to if further information is necessary with respect to the detailed description subject to the prevailing nature of the disclosure of the present application.

Modification may be done without departing from the gist and scope of the present invention as disclosed and claimed herein.

What is claimed is:

1. A permanent magnet which has been produced by the process comprising:

providing a sintered permanent magnet body consisting essentially of 10–30 at % R, wherein R is at least one element selected from the group consisting of Nd, Pr, Dy, Ho and Tb or a mixture of at least one said element and at least one other element selected from the group consisting of La, Ce, Sm, Gd, Er, Eu, Tm, Yb, Lu, Pm and Y, 2–28 at % B and at least 42 at % Fe, and wherein at least 50 vol % of the entire permanent magnet material body consists of Fe-B-R type tetragonal crystal structure;

providing an interdiffusion layer on the permanent magnet material body; and forming a low gas permeability anticorrosive coating film layer on the interdiffusion layer on the permanent magnet material body by means of vapor deposition so that corrosive substances do not remain in the resultant permanent magnet, thereby improving the corrosion resistance of the resultant permanent magnet.

2. The magnet as defined in claim 1, in which said anticorrosive thin film is formed of at least one selected from the group consisting of metals, oxides, nitrides and carbides, and mixtures thereof.

3. The magnet as defined in claim 2, in which said anticorrosive thin film is formed of at least one selected from the group consisting of Al, Ni, Cr, Cu, Co and alloys thereof, oxides of Si and Al, nitrides of Ti and Al, carbides of Ti, and mixtures thereof.

4. A permanent magnet which has been produced by the process comprising:

providing a sintered permanent magnet body consisting essentially of 10–30 at % R, wherein R is at least one element selected from the group consisting of Nd, Pr, Dy, Ho, and Tb or a mixture of at least one said element and at least one other element selected from the group consisting of La, Ce, Sm, Gd, Er, Eu, Tm, Yb, Lu, Pm and Y, 2–28 at % B and at least 42 at % Fe, and wherein at least 50 vol % of the entire permanent magnet material body consists of a Fe-B-R type tetragonal crystal structure;

preparing the surface of the permanent magnet material body by blasting;

providing an interdiffusion layer on the prepared surface of the permanent magnet material body; and then forming a low gas permeability anticorrosive coating film layer on the interdiffusion layer on the permanent magnet material body by means of vapor deposition so that corrosive substances do not remain in the resultant permanent magnet, thereby improving the corrosion resistance of the resultant permanent magnet.

5. The magnet as defined in claim 1 or 4, in which slot peening is performed after said anticorrosive thin film is formed on the surface of said permanent magnet material body.

6. The magnet as defined in claim 1, 2, 3 or 4, in which the anticorrosive coating film layer is impregnated with a resin.

7. The magnet as defined in claim 1, 2, 3, or 4 in which the anticorrosive coating film layer is impregnated with a resin.

8. The magnet as defined in claim 5, in which said shot-peened surface of said permanent magnet material body is further treated with chromating.

9. The magnet as defined in claim 5, in which the anticorrosive coating film layer is impregnated with a resin.

10. The magnet as defined in claim 8, in which the anticorrosive coating film layer is impregnated with a resin.

11. A process as defined in claim 5, in which the anticorrosive coating film layer is impregnated with a resin.

12. The magnet as defined in claim 8, in which the anticorrosive coating film layer is impregnated with a resin.

* * * * *

UNITED STATES PATENT AND TRADEMARK OFFICE
CERTIFICATE OF CORRECTION

PATENT NO. : 5,089,066

DATED : February 18, 1992

INVENTOR(S) : Takaki HAMADA, Tetsuji HAYAKAWA, Yutaka MATSUURA

It is certified that error appears in the above-identified patent and that said Letters Patent is hereby corrected as shown below:

column 36, line 30, claim 11, change "A process" to --The magnet--.

Signed and Sealed this

Seventh Day of March, 1995

Attest:

BRUCE LEHMAN

Attesting Officer

Commissioner of Patents and Trademarks